United States Patent
Paul et al.

(10) Patent No.: US 10,817,823 B2
(45) Date of Patent: Oct. 27, 2020

(54) METHOD AND DEVICE FOR GENERATING DATA SERVICES FROM HETEROGENEOUS SYSTEMS

(71) Applicant: Wipro Limited, Bangalore (IN)

(72) Inventors: Sanjoy Paul, Sugar Land, TX (US);
Senthil Kumaresan, Bangalore (IN);
ArulKumar Karthikeyan, Bangalore (IN)

(73) Assignee: Wipro Limited, Bangalore (IN)

( * ) Notice: Subject to any disclaimer, the term of this patent is extended or adjusted under 35 U.S.C. 154(b) by 198 days.

(21) Appl. No.: 16/013,312

(22) Filed: Jun. 20, 2018

(65) Prior Publication Data

US 2019/0392361 A1    Dec. 26, 2019

(51) Int. Cl.
| | |
|---|---|
| *H04L 9/00* | (2006.01) |
| *G06Q 10/06* | (2012.01) |
| *G06F 9/54* | (2006.01) |
| *G06F 21/62* | (2013.01) |
| *H04L 29/06* | (2006.01) |
| *G06F 16/18* | (2019.01) |

(52) U.S. Cl.
CPC .......... *G06Q 10/067* (2013.01); *G06F 9/542* (2013.01); *G06F 16/1805* (2019.01); *G06F 21/6227* (2013.01); *H04L 63/102* (2013.01)

(58) Field of Classification Search
CPC .................................................. G06Q 10/067
See application file for complete search history.

(56) References Cited

U.S. PATENT DOCUMENTS

| | | | |
|---|---|---|---|
| 2013/0166460 A1* | 6/2013 | Mohanty | G06Q 50/184 705/310 |
| 2014/0282586 A1* | 9/2014 | Shear | G06F 16/245 718/104 |
| 2017/0192628 A1 | 7/2017 | O'Connor et al. | |

(Continued)

OTHER PUBLICATIONS

Jabbar et al, "Semantic Interoperability in Heterogeneous IoT Infrastructure for Healthcare", Journal, 2016-2017, 1 page, Retrieved from the Internet:<https://www.hindawi.com/journals/wcmc/2017/9731806/>.

(Continued)

*Primary Examiner* — Josnel Jeudy
(74) *Attorney, Agent, or Firm* — Finnegan, Henderson, Farabow, Garrett & Dunner, LLP

(57) ABSTRACT

A method and device for generating data services from heterogeneous systems is disclosed. The method includes generating an asset data model for a parent asset based on at least one data attribute associated with the parent asset. The method further includes populating the asset data model with at least one sub-asset associated with each of the at least one data attribute and at least one event associated with the at least one sub-asset and the at least one data attribute. The method includes creating a plurality of role hierarchies across multiple organizations associated with the parent asset. The method further includes associating a plurality of stakeholders with each of the plurality of role hierarchies. The method includes associating data contracts with each of the plurality of stakeholders and each of the at least one sub-asset based on the plurality of role hierarchies and the asset data model.

17 Claims, 7 Drawing Sheets

(56) References Cited

U.S. PATENT DOCUMENTS

2017/0255373 A1  9/2017  Bruno et al.

OTHER PUBLICATIONS

Kotis et al., "Semantic Interoperability on the Internet of Things: The Semantic Smart Gateway Framework", Jul. 2013, vol. 4, Issue 3, 1 page, Retrieved from the Internet:<https://dl.acm.org/citation.cfm?id=2517538>.

Ganzha et al., "Semantic Interoperability in the Internet of Things; An Overview From the INTER-IoT Perspective", Sep. 3, 2016, 23 pages, Retrieved from the Internet:<http://www.ibspan.waw.pl/~paprzyck/mp/cvr/research/IoT_papers/JNCA_2016.pdf>.

Jabbar et al., "Semantic Interoperability in Heterogeneous IoT Infrastructure for Healthcare", Journal, 2016-2017, 11 pages, vol. 2017, Hindawi.

Kotis et al., "Semantic Interoperability on the Internet of Things: The Semantic Smart Gateway Framework", Journal, Jul. 2013, 24 pages, IGI Global.

\* cited by examiner

METHOD AND DEVICE FOR GENERATING DATA SERVICES FROM HETEROGENEOUS SYSTEMS

FIELD

This disclosure relates generally to generating data services, and more particularly to method and device for generating data services from heterogeneous systems.

BACKGROUND

Companies are coming together to provide more value to their end customer. The industry is moving towards an ecosystem partnership model so that the end customers obtain more value. When multiple companies come together to provide more value, there is a requirement to share data amongst these companies. However, the source of data in such a scenario may be from Internet of Things (IoT) systems, multiple legacy systems starting from excel, disparate systems like Customer relationship management (CRM) systems, service delivery platform (SDP) systems, and many other systems that are distributed geographically. Thus, the data is scattered across multiple systems, which may further be spread across geographies, if the companies are operating globally.

In conventional systems, in order to share data, initially, a centralized repository is created and the data to be shared is copied into centralized lake. Here, a role, such as, administrator, is defined, so that, the data can be selectively copied from the centralized repository based on the assigned role. These roles are defined when the user is on boarded, i.e., when the user is added to a specific role. Such conventional systems are not scalable as there is a need to define "n" number of different roles in order to facilitate data sharing.

SUMMARY

In one embodiment, a method for generating data services from heterogeneous systems is described. The method includes generating, by a computing device, an asset data model for a parent asset based on at least one data attribute associated with the parent asset. The method further includes populating the asset data model with at least one sub-asset associated with each of the at least one data attribute and at least one event associated with the at least one sub-asset and the at least one data attribute. The method includes creating a plurality of role hierarchies across multiple organizations associated with the parent asset. The method further includes associating a plurality of stakeholders with each of the plurality of role hierarchies. The method includes associating data contracts with each of the plurality of stakeholders and each of the at least one sub-asset based on the plurality of role hierarchies and the asset data model, wherein the data contracts define access permission policies for each of the plurality of stakeholders.

In another embodiment, a computing device for generating data services from heterogeneous systems is described. The computing device includes a processor and a memory communicatively coupled to the processor, wherein the memory stores processor instructions, which, on execution, causes the processor to generate an asset data model for a parent asset based on at least one data attribute associated with the parent asset. The processor instructions further cause the processor to populate the asset data model with at least one sub-asset associated with each of the at least one data attribute and at least one event associated with the at least one sub-asset and the at least one data attribute. The processor instructions cause the processor to create a plurality of role hierarchies across multiple organizations associated with the parent asset. The processor instructions further cause the processor to associate a plurality of stakeholders with each of the plurality of role hierarchies. The processor instructions cause the processor to associate data contracts with each of the plurality of stakeholders and each of the at least one sub-asset based on the plurality of role hierarchies and the asset data model, wherein the data contracts define access permission policies for each of the plurality of stakeholders.

In yet another embodiment, a non-transitory computer-readable storage medium having stored thereon, a set of computer-executable instructions causing a computer comprising one or more processors to perform steps comprising: generating an asset data model for a parent asset based on at least one data attribute associated with the parent asset; populating the asset data model with at least one sub-asset associated with each of the at least one data attribute and at least one event associated with the at least one sub-asset and the at least one data attribute; creating a plurality of role hierarchies across multiple organizations associated with the parent asset; associating a plurality of stakeholders with each of the plurality of role hierarchies; and associating data contracts with each of the plurality of stakeholders and each of the at least one sub-asset based on the plurality of role hierarchies and the asset data model, wherein the data contracts define access permission policies for each of the plurality of stakeholders.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
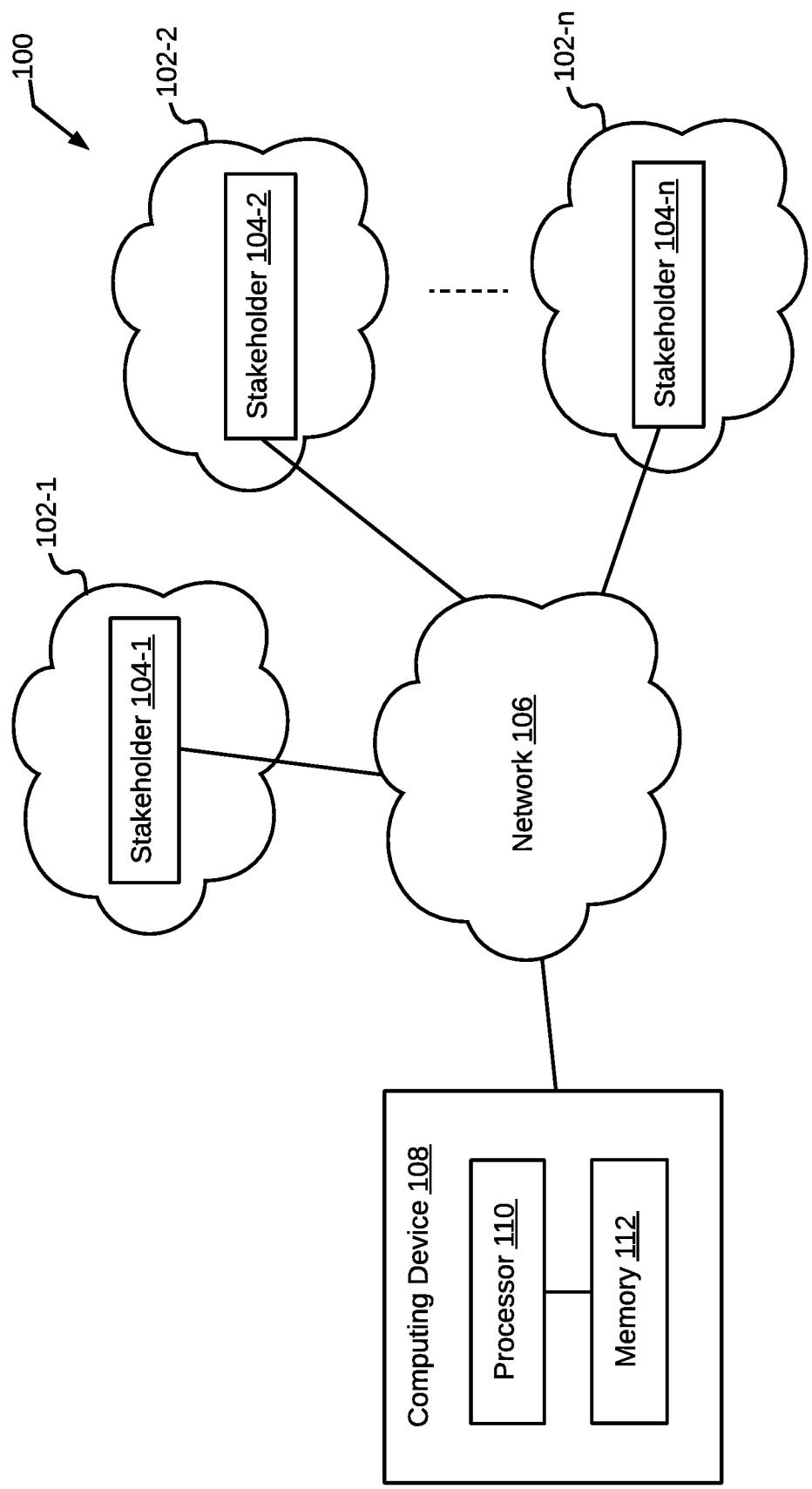
FIG. 1 is a block diagram illustrating a system for generating data services from heterogeneous systems, in accordance with an embodiment.

In one embodiment, a system 100 for generating data services from heterogeneous systems 102 is illustrated in FIG. 1. The system 100 may employ the techniques of Internet of Things (IoT) and distributed ledger, for example, Blockchain, in order to generate data services in the heterogeneous systems 102. The heterogeneous systems 102 may include systems 102-1 to 102-*n*, each of which may work on a different platform. By way of an example, each of systems 102-1 to 102-*n* may operate on different IoT platforms, which may or may not be compatible to communicate amongst each other in order to exchange information.

The heterogeneous systems 102 may further include a plurality of stakeholders 104. In other words, each of the systems 102-1 to 102-*n* may include one or more stakeholders. For example, the system 102-1 may include a stakeholder 104-1, the system 102-2 may include a stakeholder 104-2, and the system 102-*n* may include a stakeholder 102-*n*, collectively referred to as the plurality of stakeholders 104. It will be apparent to a person skilled in the art that only one stakeholder is shown per system for illustrative purpose only, and each of the systems 102-1 to 102-*n* may include multiple stakeholders.

The plurality of stakeholders 104, each of which is working on a varied platform, may exchange information amongst each other via a network 106. The network 106 may be a distributed ledger network, for example, a Blockchain network. The distributed ledger network may include a continuously growing list of interlinked records called a distributed ledger exchanged between the plurality of stakeholders 104. The records in the distributed ledger may be secured through cryptography, such that the records cannot be modified or tampered with. The distributed ledger may record transactions between two parties in a verifiable and permanent way. Accordingly, the distributed ledger network may permanently record each communication received from the plurality of stakeholders 104. This information may later be accessed by one or more of the plurality of stakeholders 104 or one or more external computing devices for further analysis.

The network 106 may enable rapid and secure exchange of data amongst the plurality of stakeholders 104. In an embodiment, the network 106 may enable creation of a data marketplace from the heterogeneous systems 102, which may be used by each of the plurality of stakeholder 104 to exchange information or data related to one or more assets. Examples of the one or more assets may include, but are not limited to automobiles, construction equipment, electronics equipment, mobile phone, kitchen appliances. Each of the one or more assets may be IoT enabled devices, which are capable of exchanging information with other systems over a network, for example, the Internet.

The system 100 further includes a computing device 108 that is communicatively coupled to the network 106. Examples of the computing device 108 may include, but are not limited to a laptop, an application server, a server, a desktop, a tablet, or a smart phone. The computing device 108 is configured to generate data services from the heterogeneous systems 102 and provide them to one or more of the plurality of stakeholders 104. In order to facilitate availability and exchange of such information amongst the plurality of stakeholder 104, the computing device 108 may create data models for various assets, organizations (that may include customers, Original Equipment Manufacturers (OEMs), dealers, financial institutions) and contracts that may include rules, scripts, or events etc. The computing device 108 may generate and store a repository of data models (not shown in FIG. 1). It will be apparent to a person skilled in the art that the computing device 108 may reside within one or more of the heterogeneous systems 102.

By way of an example, an IoT asset may be a JCB® machine and the plurality of stakeholders may include a customer, an OEM, and a dealer. Each of the plurality of stakeholders may be on a different IoT network. The customer may be interested to buy the JCB® machine and rent it to other users thereafter. The OEM, dealers, and customers may require specific information or data. For example, the OEM may need access to all technical details related to the JCB® and to other data as well, the dealer may only require technical details and personal information related to the customer, and the customer may require a snapshot of performance and other data related to the asset. In this case, the computing device 108 establishes a contract between the dealer and the OEM, such that, the contract defines what information is required to be shared by the OEM with the dealer.

By way of another example, a consumer may be interested to buy a JCB® machine. The consumer may approach a bank (stakeholder) for a loan to buy the JCB® machine. The bank may approve the loan and the user may subsequently buy the JCB® machine. After few months, the bank may notice that the consumer has defaulted on the loan for 2-3 months. In this case, the data model created by the computing device 108 may be used by the bank, through the dealer, to determine and extract relevant data associated with the JCB® machine, such as, fuel usage, JCB® machine utilization, engine run hours, or breakdown. The bank officials may approach the dealer and request for the relevant data associated with the JCB® machine, in order to determine current state of the JCB® machine. To this end, the computing device 108 after creating a data model that includes all the stakeholders (including the bank) dynamically generate a contract between the bank and the dealer. The contract defines the information that can be shared with the dealer. Thus, the system 100 facilitates collaboration between companies or organizations to rapidly and securely share relevant data between the plurality of stakeholders 108.

In order to generate data services from the heterogeneous systems 102 and provide them to one or more of the plurality of stakeholders 104, the computing device 108 includes a processor 110 and a memory 112, which is communicatively coupled to the processor 110. The memory 112 stores processor instructions, which on execution cause the processor 110 to generate data services from the heterogeneous systems 102. The memory 112 may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of the volatile memory may include, but are not limited Dynamic Random Access Memory (DRAM), and Static Random-Access memory (SRAM). The memory 112 may further include various modules, which are explained in detail in conjunction with FIG. 2.

Figure 2:
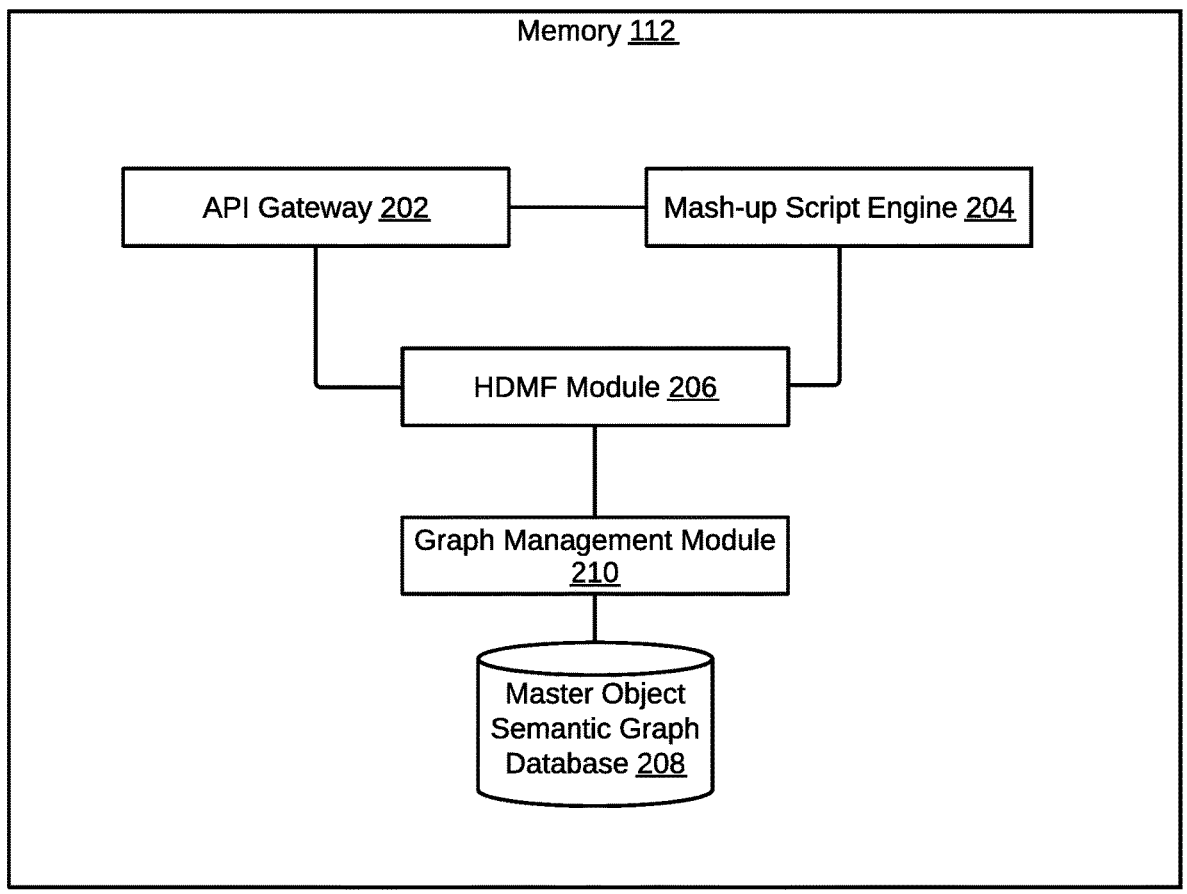
FIG. 2 illustrates a block diagram of a memory of a computing device configured to generating data services from heterogeneous systems, in accordance with an embodiment.

Referring now to FIG. 2, the memory 112 of the computing device 108 configured to generate data services from the heterogeneous systems 102 is illustrated, in accordance with an embodiment. The memory 112 includes an Application Programming Interface (API) gateway 202, a mash-up script engine 204, a Higher Dimensional Modelling Framework (HDMF) module 206, a master object semantic graph database 208, a graph management module 210.

The master object semantic graph database 208 creates asset data model for assets. In other words, master object semantic graph database 208 models various assets. To this end, the master object semantic graph database 208 stores a plurality of generic data models. Depending on the nature of business and a set of questions, the master object semantic graph database 208 populates the generic data models with some pre-existing data (template with questions/intelligence) to generate an asset specific asset data model. This is further explained in detail in conjunction with FIG. 3 and FIG. 4.

The HDMF module 206 is configured to build and authenticate contract data models for data contracts. The contract data models are stored in the master object semantic graph database 208. For each contract data model, there is a pre-built model that includes "Term Data", "Term Event", "Term Service," based upon the business application. The "Term Data" may denote data items that can be shared with other stakeholders, the "Term Event" may denote the event or alarm that has to be shared with other stakeholders, and "Term Service" may denote the service schedule for the asset. In the context of asset management application, additional contract definitions may be created. For example, if the context of the business application is "Chemical paper factory" then "Term Business Formula" may be an additional contract definition. This is further explained in detail in conjunction with FIG. 3 and FIG. 4.

The mash-up script engine 204 is used to create mash-up scripts to access the data from multiple sources based on the data contracts defined by the HDMF module 206. Additionally, the mash-up script engine 204 acts as a connector to other legacy systems, i.e., IoT systems and distributed ledger networks. The mash-up script engine 204 is also responsible to establish the connection, obtain the desired data as per the template defined during the contract definition, execute the mash-up scripts at run time, and provide the output in the desired format. This is further explained in detail in conjunction with FIG. 3 and FIG. 4.

The API gateway 202 receives an API request that is made to retrieve current snapshot of a particular data, for example, "GetCurrentStatusofMachine (AssetID, RequestorID)". The API gateway 202 performs basic authentication and upon successful authentication, the API request is sent to the HDMF module 206. Additionally, for every input request for the HDMF module 206, the API gateway 202 validates data access requested through input request based on the contract associated with each user to determine whether the requested data can be serviced to this user or not. Based on the API request received, there might be a need to correlate the data from external systems, for example, IoT Platforms or distributed ledger networks. In this case, the API gateway 202 may invoke the mash-up script engine 204. Once the requested data is retrieved, the API gateway 202 provides the request data as an output to the generator of the API request. This is further explained in detail in conjunction with FIG. 3 and FIG. 4.

The HDMF module 206 is further configured to receive information from the API gateway 202 and the mashup-script engine 204. Here, the API gateway 202 provides information about what data is required and the entity requesting access to the data. The mash-up script engine 204 provides input to the HDMF module 206 about which mash-up script needs to be executed. Based on the above information, the HDMF module 206 operates depending upon the context, business, and the stakeholders involved in servicing the API request. This is further explained in detail in conjunction with FIG. 3 and FIG. 4.

With all the inputs, the graph management module 210 is invoked. The graph management module 210 shows how an entire data model is build and how each of the data model is tagged to a specific industry. Further, the graph management module 210 handles all tags and every data model that is created. Based on inputs received from the HDMF module 206, the graph management module 210 traverses through the data model to validate the API request for authentication and authorization.

Figure 3:
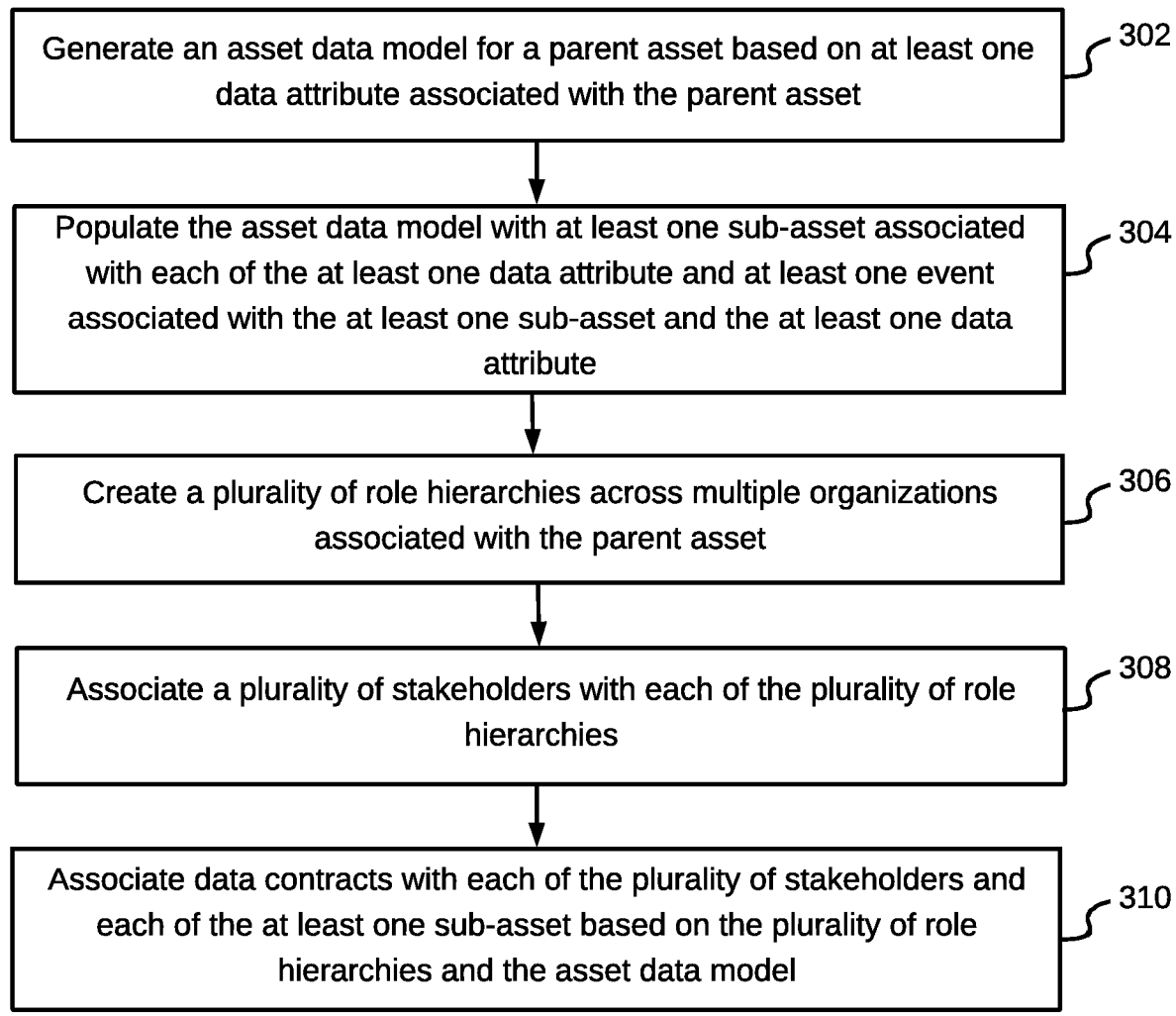
FIG. 3 illustrates a flowchart of a method for generating data services from heterogeneous systems, in accordance with an embodiment.

Referring now to FIG. 3, a flowchart of a method for generating data services from heterogeneous systems, in accordance with an embodiment. At step 302, the computing device 108 generates an asset data model for a parent asset based on one or more data attributes associated with the parent asset. The parent asset, for example, may be one of, but is not limited to automobiles, construction equipment, electronics equipment, mobile phone, kitchen appliances. When the parent asset is an automobile, the one or more data attributes, may include, but are not limited to engine temperature, battery voltage, battery charge, or engine oil pressure.

In order to generate the asset data model, the computing device 108 first identifies a generic data model related to the parent asset from the master object semantic graph database 208. The computing device 108 then modifies the generic data model based on the one or more data attributes associated with the parent asset. As explained earlier in FIG. 2, the master object semantic graph database 208 stores a plurality of data models for multiple parent assets. Each of the plurality of data models may be generic data models for a particular class of parent asset.

By way of an example, a generic data model for a car, which may have the following data attributes: engine temperature, battery voltage, battery charge, or engine oil pressure, may preexist in the master object semantic graph database 208. When a particular car manufacturing company decides to implement the system 100 in order to monitor and record data for various car models of cars manufactured by them, the company may start with the generic data model for cars. In this case, some data attributes that are specific to the cars manufactured by the company are also added to the generic data model to generate the asset data model for cars manufactured by the company. Examples of these specific data attributes may include, but are not limited to information related to anti-braking system or electronic steering system. The asset data model for cars manufactured by the company may then be stored in the master object semantic graph database 208 for future use.

Once the asset data model is generated, the computing device 108, at step 304, populates the asset data model with one or more sub-assets associated with the one or more data attributes. The one or more sub-assets may be sub-components of the parent asset. By way of an example, when the parent asset is a car, the sub-assets may include, but are not limited to the engine, battery, steering wheel, filters, anti-braking system, or suspension etc. These sub-assets would also be populated in the asset data model generated for the car. In addition to populating the sub-assets in the asset data model, additional information related to the sub-assets may also be populated. The additional information for a sub-asset, for example, may include, but is not limited to a particular class associated with the sub-asset, manufacturer of the sub-asset, year of manufacturing of the sub-asset.

In other words, an asset (whether parent asset or sub-asset) that is created may have any number of properties that may be stored along with the asset. The computing device 108 may have the intelligence to pre-populate required properties associated with an asset based on the industry, domain, and various other context information. The computing device 108 also provides the flexibility to define additional properties that have not been initially generated.

Additionally, at step 304, the computing device 108 populates the asset data model with one or more events associated with the one or more sub-assets and the one or more data attributes. Examples of one or more events may include, but are not limited to pressure sensor failure, engine malfunction, or incorrect sensor calibration. Based on data items that are defined for an asset, the computing device 108 may intelligently create events so that an end user may be able to define thresholds. By way of an example, in a heavy equipment machinery, properties that may be monitored, may include, but are not limited to engine coolant temperature, engine oil pressure, latitude, longitude, altitude, speed, or engine running band 1, engine running band 2 to engine running band 6. The computing device 108 may intelligently create events for engine coolant temperature, engine oil pressure, which should have minimum and maximum threshold range, while for latitude and longitude parameters, the computing device 108 may automatically define a geo-fence and time-fence type of a rule item.

The computing device 108, at step 306, creates a plurality of role hierarchies across multiple organizations associated with the parent asset. The computing device 108 may then associate a plurality of stakeholders with each of the plurality of role hierarchies at step 308. The plurality of role hierarchies across the multiple organizations enables defining an ecosystem collaboration structure. By way of an example, when the parent asset is an automobile, a role hierarchy may be: OEM→dealer→customer. By way of another example, when the parent asset is paper, a role hierarchy may be: paper manufacturing company→Sub-Components Manufacturer→Contract Manufacturers. In an embodiment, a role hierarchy may be made more granular by defining sub-hierarchy for each node in the role hierarchy. By way of an example, for the role hierarchy: OEM-→dealer→customer, a further sub-hierarchy may be defined for the OEM.

Based on the plurality of role hierarchies and the asset data model generated at step 302, the computing device 108, at step 310, associates data contracts with each of the plurality of stakeholders and each of the one or more sub-assets. The data contracts define access permission policies for each of the plurality of stakeholders. The access permission policies determine permission for a stakeholder to view, modify, or add data associated with a sub-asset from the at least one sub-asset. The creation and association of data contracts is further explained in detail in conjunction with FIG. 4.

Figure 4:
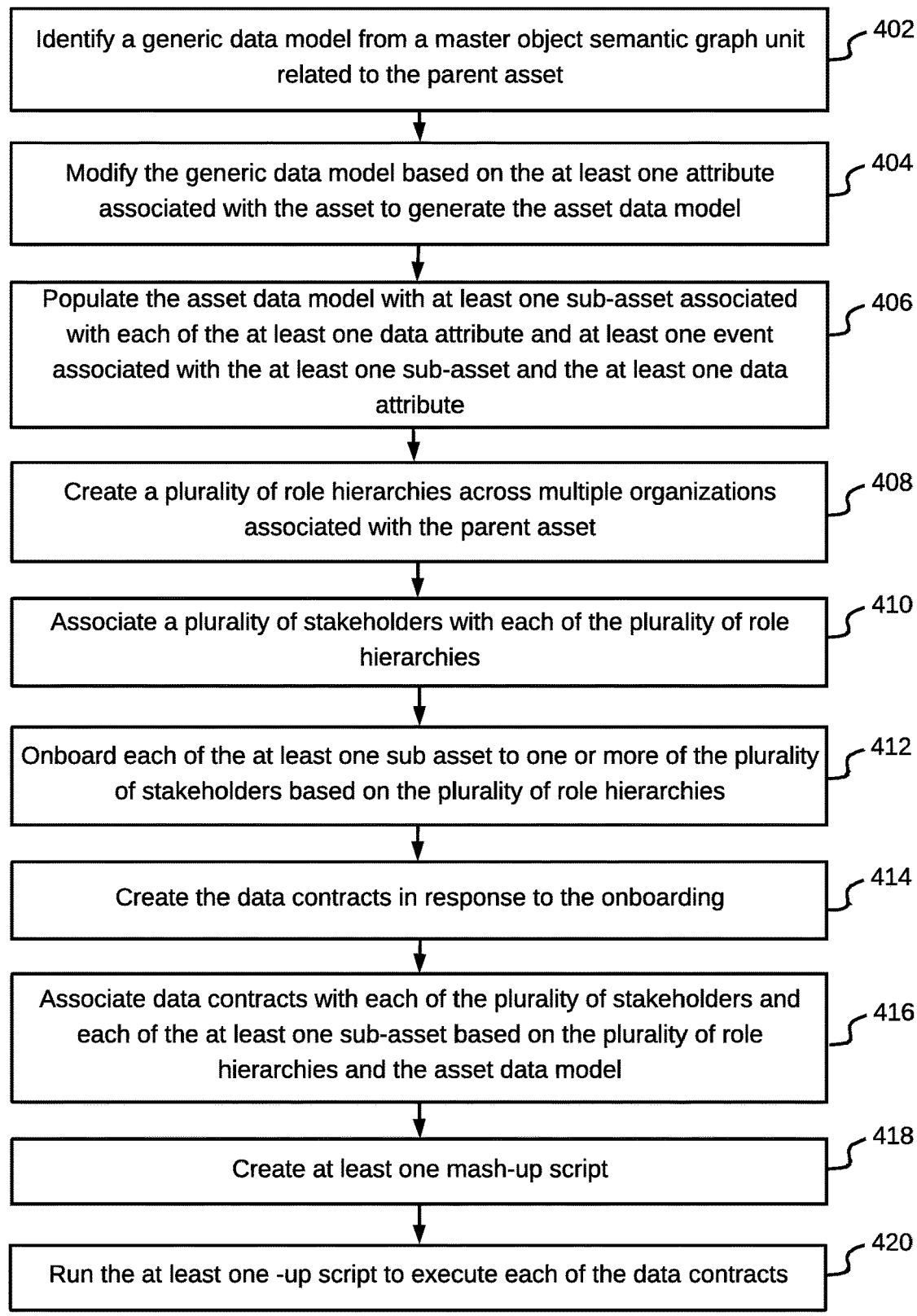
FIG. 4 illustrates a flowchart of a method for generating data services from heterogeneous systems, in accordance with another embodiment.

Referring now to FIG. 4, a flowchart of a method for generating data services from heterogeneous systems is illustrated, in accordance with another embodiment. At step 402, a generic data model related to a parent asset is identified from the master object semantic graph database 208. At step 404, the generic data model is modified based on one or more data attributes associated with the parent asset. At step 406, the asset data model is populated with one or more sub-assets associated with each of the one or more data attributes and one or more events associated with the one or more sub-assets and the one or more data attributes. At step 408, a plurality of role hierarchies are created across multiple organizations associated with the parent asset. At step 410, a plurality of stakeholders are associated with each of the plurality of role hierarchies. This has already been explained in detail in conjunction with FIG. 3.

At step 412, each of the one or more sub-asset is on-boarded to one or more of the plurality of stakeholders based on the plurality of role hierarchies. In an embodiment, the HDMF module 206 maps the plurality of role hierarchies and the asset data model generated for the parent asset to define an ownership model for one or more of the plurality of stakeholders, for example, customers or users. The assets are created as an instance from associated classes for these assets and each asset is on-boarded to a specific user/customer (stakeholder).

At step 414, data contracts are created in response to the onboarding. The data contracts may either be completely virtual or may represent a physical contract. Additionally, the data contracts may be created based on nature of business associated with the parent asset. In an embodiment, the HDMF module 206 may provide a data model to define contracts, such that, the data model may vary based upon the type of business, in which the plurality of stakeholders are involved. The data contracts may be created based on one or more inputs, which may include, but are not limited to term data, term mashup, or term events. In an embodiment, the initial data contract definitions in the system 100 may include, but are not limited to: TermData (which data), TermEvent (which events), TermService (which service schedules), and TermMashupScripts (which mashup scripts). The HDMF module 206 may add or append other contract definitions by utilizing existing semantic data models.

Thereafter, at step 416, the data contracts are associated with each of the plurality of stakeholders and each of the one or more sub-assets. The data contracts define access permission policies for each of the plurality of stakeholders. The access permission policies determine permission for a stakeholder to view, modify, or add data associated with a sub-asset from the at least one sub-asset. Modify may also be used to change a parameter that may trigger an action (for example, start or stop) on an asset (which may be a device).

Once the data contracts are associated, one or more mash-up scripts are created at step 418. In an embodiment, the mash-up script engine 204 may generate a mash-up script to prepare the data as a response to an API request. The mash-up scripts may be created by selecting the system or external API and by defining the input parameters and output parameters on a case-to-case basis. By way of an example, a mash-up script that may retriever details of machines that are due for service and the contact details of respective owners is to be created. In this scenario, the mash-up script may obtain details related to the machines that are due for service depending upon the current ODO and last service date. The mash-up script may then obtain machine ID's and search in Customer Relationship Management (CRM) systems for telephonic details of respective owners. The output of this mash-up script is defined as: [Machine ID, service due (Yes/No), customer name, customer address, customer telephone number].

By way of another example, when one of the stakeholders 'A' tries to access data from the following: Stakeholder A→System SA: DP_X1, DP_Y1; Stakeholder B→System SBx: DP_X2, DP_Y2 and System SBy: DP_X3, DP_Y3;

Stakeholder C→System SCx: DP_X4, DP_Y4, DP_Z4. In this case, a mash-up script may be written to curate the data as follows:

Start Script MASHUP_ONE
Establish Connection System_SA //Stakeholder A System
Read and Store DP_X1, DP_Y1
Disconnect System_SA Connection
Establish Connection System_SBx //Stakeholder B System
Read and Store DP_X2, DP_Y2
Disconnect System_SBx Connection
Establish Connection System_SBy //Stakeholder B System
Read and Store DP_X3, DP_Y3
Disconnect System_SBy Connection
Establish Connection System_SCx //Stakeholder C System
Read and Store DP_X4, DP_Y4, DP_Z4
Disconnect System_SCx Connection
Exit.

At step 420, the one or more mash-up scripts are run to execute each of the data contracts. In an embodiment, the HDMF module 206 may tag the generated mash-up scripts to data models for the data contracts. In continuation of the example above, when the stakeholder 'A' tries to access this curated data, the mash-up scripts to which the stakeholder 'A' has access to are identified. If the corresponding mash-up script is enabled, the mash-up script is run in order to execute the associated contract. During runtime, the mash-script is executed to curate the data for the stakeholder 'A'.

In an embodiment, the one or more mash-up scripts generated at step 418 may be stored in the master object semantic graph database 208 and may further be stored in a distributed ledger network. As a result of this method, the latest access mechanism (by way of mash-up scripts) is updated and recorded automatically onto the distributed ledger network by the mash-up script engine 204, thereby ensuring high degree of security mechanisms. The mash-up script engine 204 may also log the data access and run time execution to the distributed ledger network. The mash-up script engine 204 may report the data to each of the plurality of stakeholders in order to increase transparency and accountability with data sharing.

Figure 5:
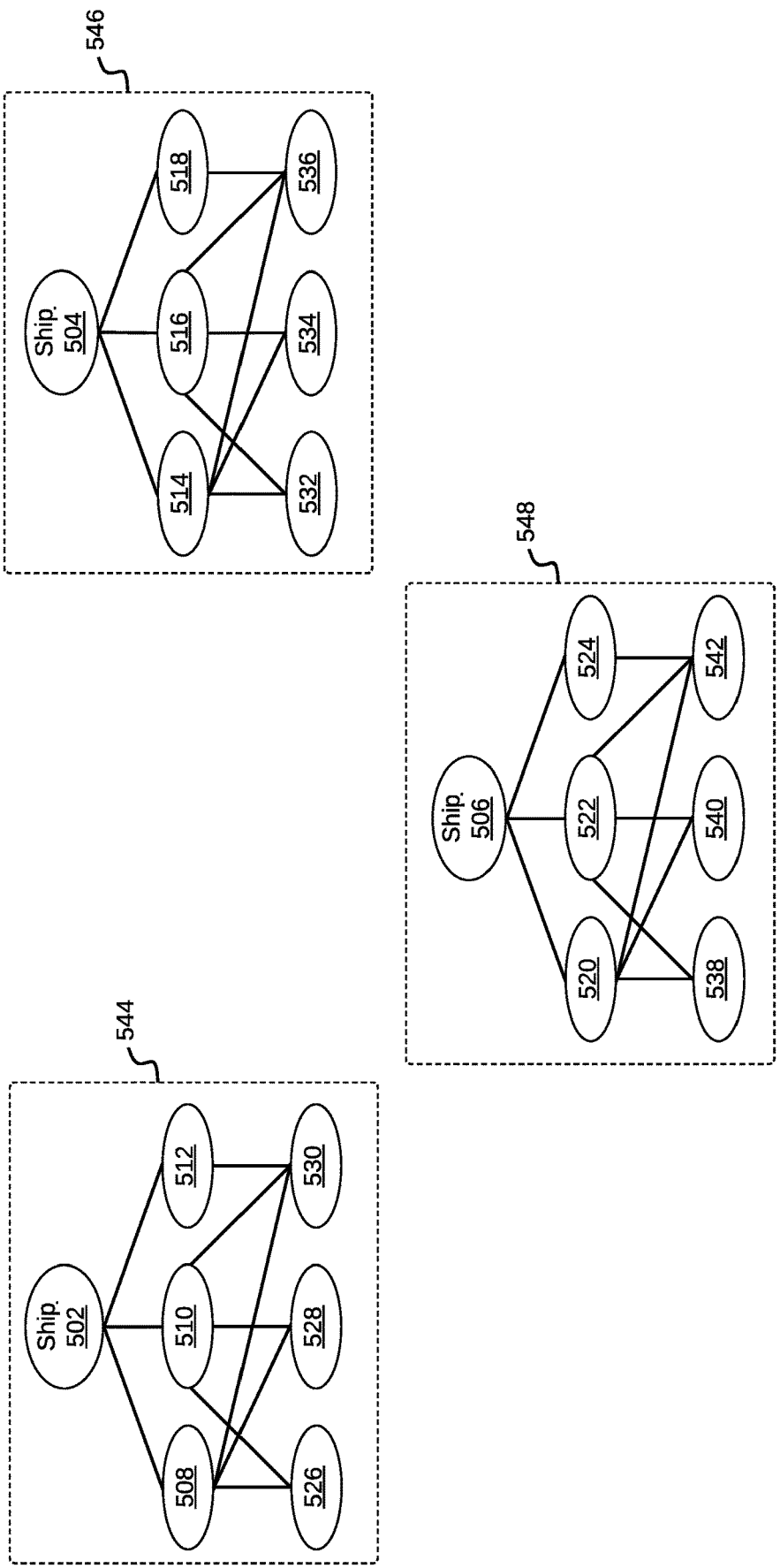
FIG. 5 illustrates integration of heterogeneous systems related to ships in order to generate data services therein, in accordance with an exemplary embodiment.

Referring now to FIG. 5, integration of heterogeneous systems related to ships in order to generate data services therein is illustrated, in accordance with an exemplary embodiment. The heterogeneous systems of this exemplary embodiment includes a ship 502, a ship 504, and a ship 506. Each of the ships 502 to 506 include the following components: electrical, mechanical, and water system. For the ship 502 these components are depicted by nodes 508, 510, and 512 respectively; for the ship 504, these components are depicted by nodes 514, 516, and 518 respectively; and for the ship 506 these components are depicted by nodes 520, 522, and 524 respectively.

For each of the ships 502 to 506, the electrical, mechanical, and water system components further include the following sub-components, i.e., Engine, Drive, and Turbine. For the ship 502 these components are depicted by nodes 526, 528, and 530 respectively; for the ship 504, these components are depicted by nodes 532, 534, and 536 respectively; and for the ship 506 these components are depicted by nodes 538, 540, and 542 respectively. Thus, an asset data model for the ship 502 that displays hierarchies and relationship between the above discussed components is depicted by 544. Similarly, an asset data model for the ship 504 is depicted by 546 and an asset data model for the ship 506 is depicted by 548.

One or more of the above discussed components is manufacture by one of the three OEM's, i.e., a company-1, a company-2, and a company-3. The company-2 has manufactured the drive (depicted by 528) for the ship 502 and the company-3 has manufactured the drive (depicted by 534) for the ship 504 and the drive (depicted by 540) for the ship 506. When the company-3 wants to evaluate how is the drive (depicted by 528) manufactured by the company-2 functioning, then the company-3 and the company-2 will get into a contract using the system and methods discussed n FIG. 1 to FIG. 4, so that the company-3 may have access to ONLY data related to the drive (depicted by 528) of the ship 502.

In a similar manner, when a ship operator (not shown in FIG. 5) wants to have access to all details related to all components in the ships 502 to 506, the company-2, the company-3, and the company-1, may have to create contract definition, so that the ship operator can have access to all data almost instantaneously.

Figure 6:
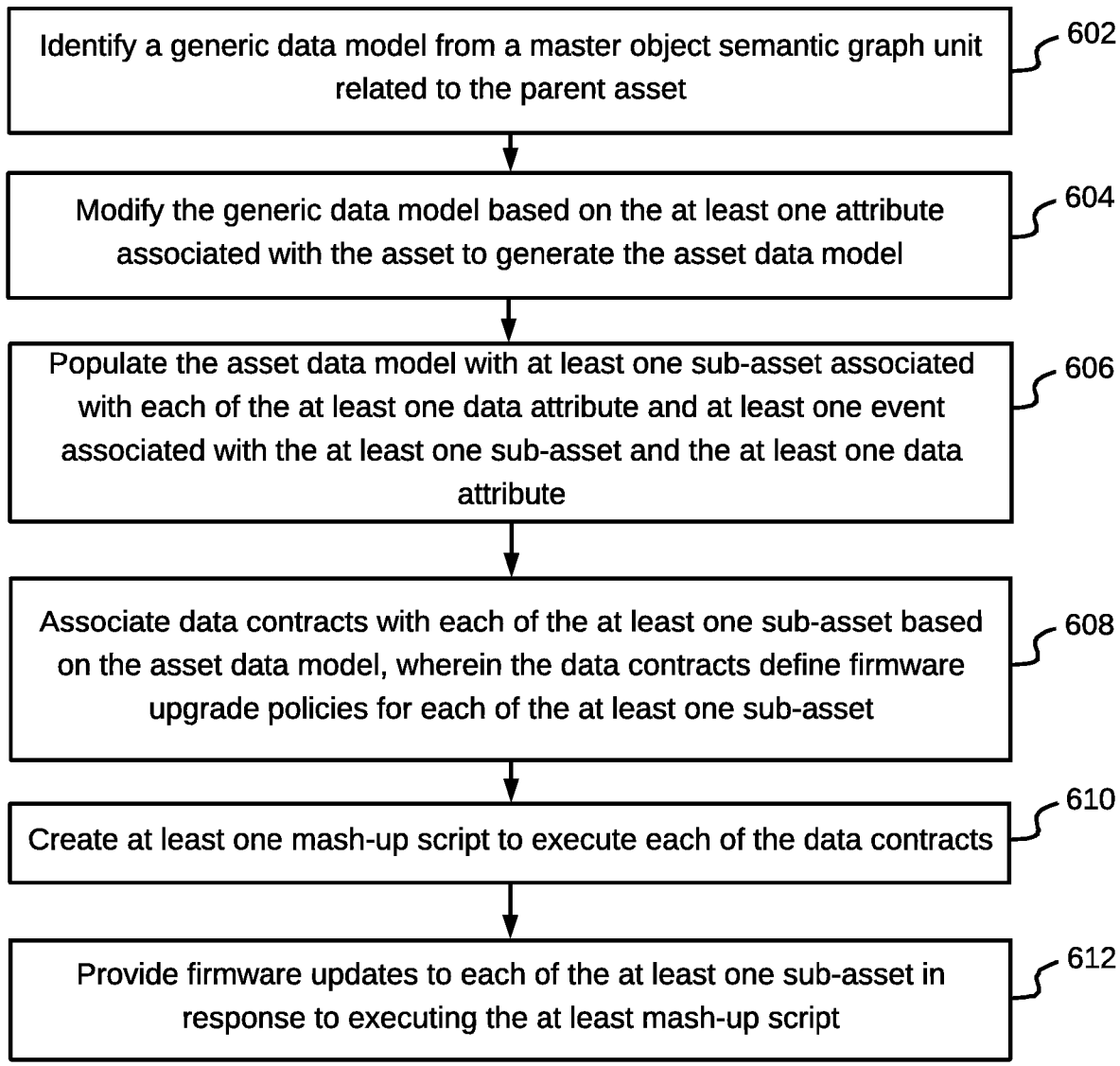
FIG. 6 illustrates a flowchart of a method for providing firmware upgrades to assets, in accordance with an exemplary embodiment.

Referring now to FIG. 6, a flowchart of a method for providing firmware upgrades to assets is illustrated, in accordance with an exemplary embodiment. At step 602, a generic data model related to a parent asset is identified from the master object semantic graph database 208. At step 604, the generic data model is modified based on one or more data attributes associated with the parent asset. At step 606, the asset data model is populated with one or more sub-assets associated with each of the one or more data attributes and one or more events associated with the one or more sub-assets and the one or more data attributes. This has already been explained in detail in conjunction with FIG. 3 and FIG. 4.

At step 608, data contracts are associated with each of the one or more sub-assets based on the asset data model. The data contracts define firmware upgrade policies for each of the one or more sub-assets. At step 610, one or more mash-up scripts are created to execute the data contracts. In response to executing the one or more mashup scripts, firmware updates are provided to each of the one or more sub-assets at step 612. Thus, the firmware updates may be effectively executed over the air.

By way of an example, the parent asset may be a wall saw, which includes two primary components (sub-assets), i.e., a saw head and wireless remote control. The saw head and the wireless remote may further include multiple components (sub-assets). Thus, an asset data model may be created and populated using the above information. Using the asset data model, multiple hierarchies and relationships between these components may be defined. Data contracts may accordingly be associated with each sub-asset. The mash-up scripts created for these contracts may then be used to push compatible bundles (firmware) to a relevant sub-asset. As a result, real time firmware updates may be performed by deciding on the compatible versions of firmware bundles for each component.

Figure 7:
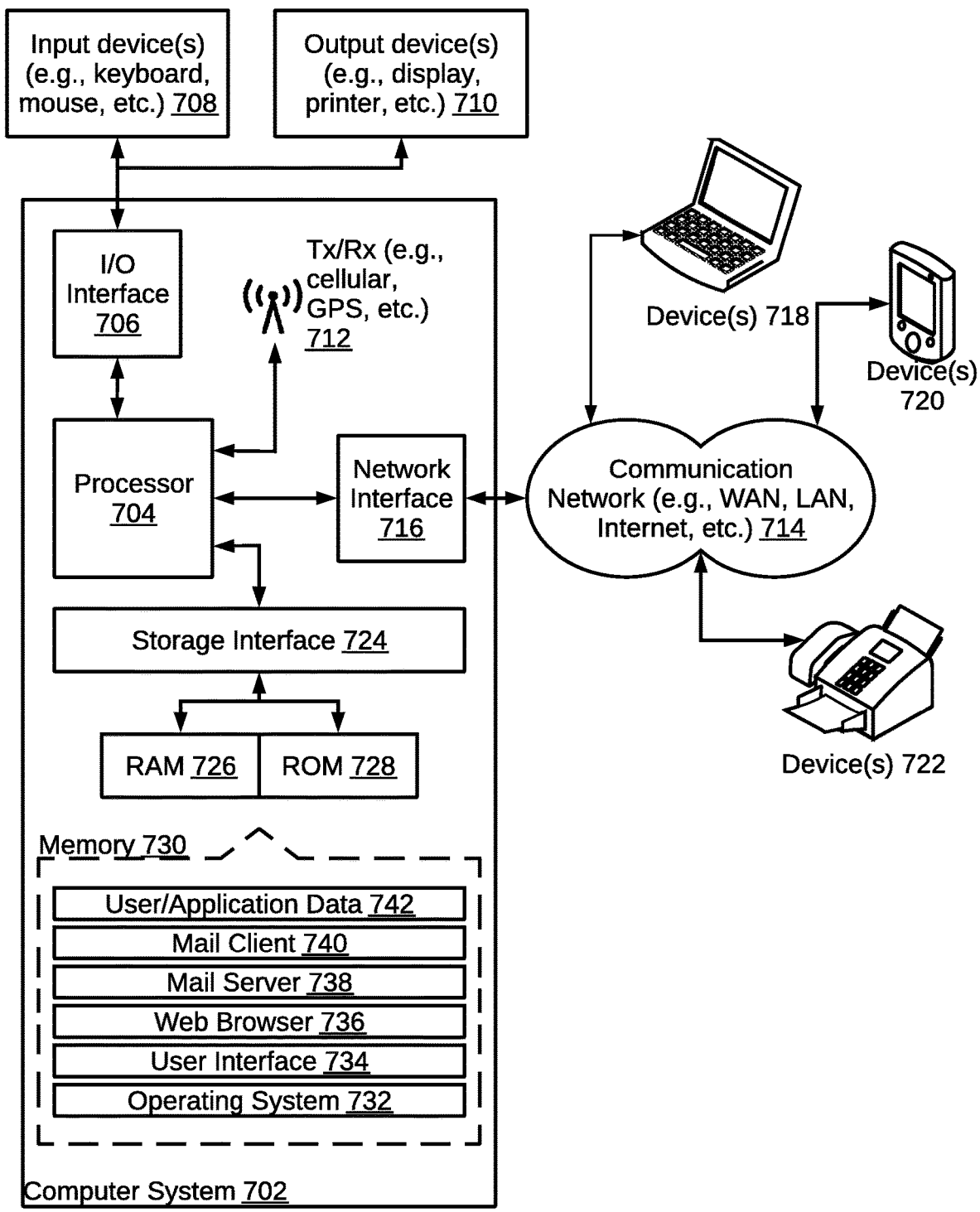
FIG. 7 illustrates a block diagram of an exemplary computer system for implementing embodiments consistent with the present disclosure.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 718-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for generating data services from heterogeneous systems. The provided method and device enable exchanging information when more than one stakeholders are involved. The proposed method is applicable to multiple domains, wherever ecosystem collaboration is required. Further, a mechanism is provided to address the issue of sharing of data with the ecosystem partners or to enable a "Data as a Service" or to establish a "Data Monetization strategy", enabling data sharing and access control at run time.

Unlike the conventional methods and systems, the proposed methods and system has the following advantages. The proposed system does not connect, collect, and store the information to a central repository. Further, the proposed system uses its data models to authenticate the appropriate mash-up script that has to be run for the context. In other words, in the proposed method, no data is stored and the data is forwarded as per the defined template in response to mash-up script execution. In the proposed method, the mash-up scripts and the contract definition are stored in a distributed ledger network, thereby increasing transparency and accountability. By using the distributed ledger network, the proposed system provides accountability and relevant data such as "Which Script" executed by "Which Stakeholder", "Which Data" was "accessed" and "When" are all stored for audits.

Moreover, as semantic graph data models are used, it is easy to have a scalable and secure approach since all the data can be governed from the distributed ledger network. As a result of the mash-up scripts, the proposed system enables a rapid and secure way to collate data from multiple systems, across platforms, without copying the data to the proposed system. Since, the mash-up script definition is part of the contract data model, the mash-up scripts can also be controlled at a granular level. As a result, a fine grained authorization may be established at run time.

The specification has described method and device for generating data services from heterogeneous systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating data services from heterogeneous systems, the method comprising:
   generating, by a computing device, an asset data model for a parent asset based on at least one data attribute associated with the parent asset, wherein generating comprises:
   identifying a generic data model from a master object semantic graph unit related to the parent asset; and
   modifying the generic data model based on the at least one data attribute associated with the parent asset;

populating, by the computing device, the asset data model with at least one sub-asset associated with each of the at least one data attribute and at least one event associated with the at least one sub-asset and the at least one data attribute;

creating, by the computing device, a plurality of role hierarchies across multiple organizations associated with the parent asset;

associating, by the computing device, a plurality of stakeholders with each of the plurality of role hierarchies; and associating, by the computing device, data contracts with each of the plurality of stakeholders and each of the at least one sub-asset based on the plurality of role hierarchies and the asset data model, wherein the data contracts define access permission policies for each of the plurality of stakeholders.

2. The method of claim 1 further comprises onboarding each of the at least one sub-asset to one or more of the plurality of stakeholders based on the plurality of role hierarchies.

3. The method of claim 2 further comprising creating the data contracts in response to the onboarding.

4. The method of claim 3, wherein the data contracts are created based on at least one input comprising term data, term mashup, or term events.

5. The method of claim 3, wherein the data contracts are created based on nature of business associated with the parent asset.

6. The method of claim 1, wherein the access permission policies determine permission for a stakeholder to view, modify, or add data associated with a sub-asset from the at least one sub-asset.

7. The method of claim 1 further comprising creating at least one mashup script to execute each of the data contracts.

8. The method of claim 1 further comprising providing firmware updates to each of the at least one sub-asset based on the data contracts associated with each of the at least one sub-asset.

9. A computing device for generating data services from heterogeneous systems, the computing device comprising:
a processor; and
a memory communicatively coupled to the processor, wherein the memory stores processor instructions, which, on execution, causes the processor to:
generate an asset data model for a parent asset based on at least one data attribute associated with the parent asset, wherein to generate the processor instructions further cause the processor to:
identify a generic data model from a master object semantic graph unit related to the parent asset; and
modify the generic data model based on the at least one data attribute associated with the parent asset;
populate the asset data model with at least one sub-asset associated with each of the at least one data attribute and at least one event associated with the at least one sub-asset and the at least one data attribute;
create a plurality of role hierarchies across multiple organizations associated with the parent asset;
associate a plurality of stakeholders with each of the plurality of role hierarchies; and
associate data contracts with each of the plurality of stakeholders and each of the at least one sub-asset based on the plurality of role hierarchies and the asset data model, wherein the data contracts define access permission policies for each of the plurality of stakeholders.

10. The computing device of claim 9, wherein the processor instructions further cause the processor to onboard each of the at least one sub-asset to one or more of the plurality of stakeholders based on the plurality of role hierarchies.

11. The computing device of claim 10, the processor instructions further cause the processor to create the data contracts in response to the onboarding.

12. The computing device of claim 11, wherein the data contracts are created based on at least one input comprising term data, term mashup, or term events.

13. The computing device of claim 11, wherein the data contracts are created based on nature of business associated with the parent asset.

14. The computing device of claim 9, wherein the access permission policies determine permission for a stakeholder to view, modify, or add data associated with a sub-asset from the at least one sub-asset.

15. The computing device of claim 9, wherein the processor instructions further cause the processor to create at least one mashup script to execute each of the data contracts.

16. The computing device of claim 9, wherein the processor instructions further cause the processor to provide firmware updates to each of the at least one sub-asset based on the data contracts associated with each of the at least one sub-asset.

17. A non-transitory computer-readable storage medium having stored thereon, a set of computer-executable instructions causing a computer comprising one or more processors to perform steps comprising:
generating an asset data model for a parent asset based on at least one data attribute associated with the parent asset, wherein generating comprises:
identifying a generic data model from a master object semantic graph unit related to the parent asset; and
modifying the generic data model based on the at least one data attribute associated with the parent asset;
populating the asset data model with at least one sub-asset associated with each of the at least one data attribute and at least one event associated with the at least one sub-asset and the at least one data attribute;
creating a plurality of role hierarchies across multiple organizations associated with the parent asset;
associating a plurality of stakeholders with each of the plurality of role hierarchies; and
associating data contracts with each of the plurality of stakeholders and each of the at least one sub-asset based on the plurality of role hierarchies and the asset data model, wherein the data contracts define access permission policies for each of the plurality of stakeholders.

* * * * *